(12) United States Patent
Gaertner et al.

(10) Patent No.: US 6,430,497 B1
(45) Date of Patent: Aug. 6, 2002

(54) NAVIGATION SYSTEM AND A METHOD FOR OPERATING IT AS WELL AS A NAVIGATION DATA CARRIER AND A METHOD FOR WRITING ONTO IT

(75) Inventors: Ulrich Gaertner, Nordstemmen; Anton Mindl, Lüdenscheid, both of (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/581,662

(22) PCT Filed: Jul. 16, 1999

(86) PCT No.: PCT/DE99/02205

§ 371 (c)(1),
(2), (4) Date: Aug. 3, 2000

(87) PCT Pub. No.: WO00/23766

PCT Pub. Date: Apr. 27, 2000

(30) Foreign Application Priority Data

Oct. 16, 1998 (DE) .......................................... 198 47 730

(51) Int. Cl.[7] ................................................ G01S 3/02
(52) U.S. Cl. .......................... 701/200; 701/25; 701/35; 73/178 R
(58) Field of Search ................................ 701/200, 208, 701/35, 25, 24; 73/178 R

(56) References Cited

U.S. PATENT DOCUMENTS

| | | | | |
|---|---|---|---|---|
| 3,925,641 A | * | 12/1975 | Kashio | ..................... 235/150.2 |
| 5,177,685 A | * | 1/1993 | Davis et al. | ................. 364/443 |
| 5,398,190 A | * | 3/1995 | Wortham | ..................... 455/456 |
| 5,440,491 A | * | 8/1995 | Kawano et al. | ............. 701/200 |
| 5,767,795 A | * | 6/1998 | Schaphorst | .................. 340/988 |
| 5,806,018 A | * | 9/1998 | Smith et al. | ................. 701/211 |
| 5,911,773 A | * | 6/1999 | Mutsuga et al. | ............ 701/200 |
| 5,938,721 A | * | 8/1999 | Dussell et al. | .............. 701/211 |
| 5,982,298 A | * | 11/1999 | Lappenbusch et al. | ...... 340/905 |
| 6,012,012 A | * | 1/2000 | Fleck et al. | ................. 701/117 |
| 6,023,653 A | * | 2/2000 | Ichimura et al. | ............ 701/208 |
| 6,124,810 A | * | 9/2000 | Segal et al. | .................. 340/994 |
| 6,131,066 A | * | 10/2000 | Ahrens et al. | .............. 701/200 |
| 6,141,611 A | * | 10/2000 | Mackey et al. | ................ 701/35 |
| 6,151,505 A | * | 11/2000 | Larkins et al. | .............. 455/456 |
| 6,163,753 A | * | 12/2000 | Beckmann et al. | ......... 701/213 |

FOREIGN PATENT DOCUMENTS

| | | |
|---|---|---|
| DE | 196 20 845 | 11/1996 |
| EP | 0 768 638 | 4/1997 |

* cited by examiner

Primary Examiner—William A. Cuchlinski, Jr.
Assistant Examiner—Olga Hernandez
(74) Attorney, Agent, or Firm—Kenyon & Kenyon

(57) ABSTRACT

A navigation system is described having a navigation computer, a data carrier reading device, and a navigation data carrier, navigation data of possible destinations stored on the navigation data carrier being able to be read out using the data carrier reading device and to be read into a working memory of the navigation computer. In this context, the navigation data carrier is configured such that the navigation data are stored on it sequentially so as to be able to be read out in one read operation.

21 Claims, 1 Drawing Sheet

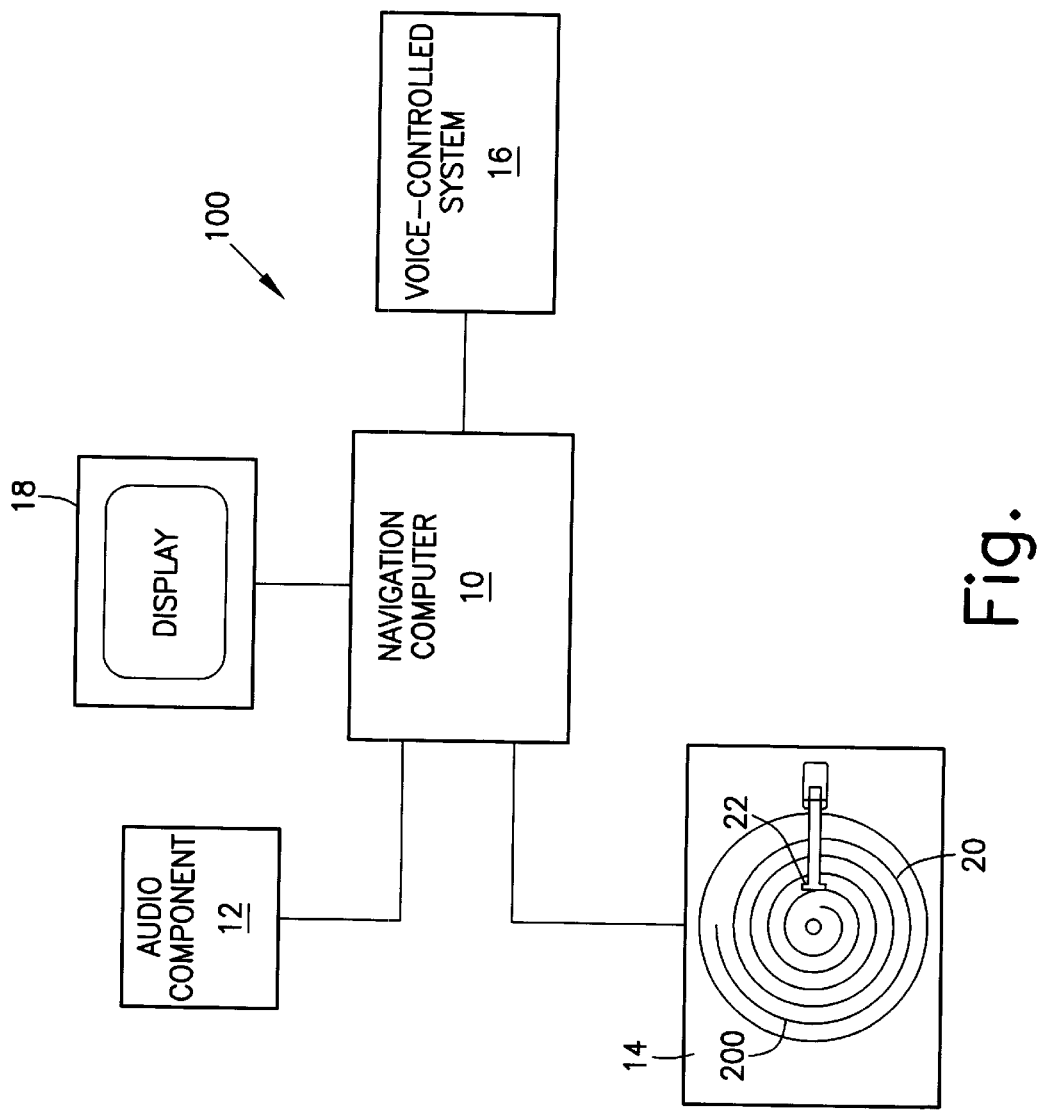

NAVIGATION SYSTEM AND A METHOD FOR OPERATING IT AS WELL AS A NAVIGATION DATA CARRIER AND A METHOD FOR WRITING ONTO IT

FIELD OF THE INVENTION

The present invention relates to a navigation system, and a method for operating it, having a navigation computer, a data carrier reading device, and a navigation data carrier, the navigation data of possible destinations stored on the navigation data carrier being able to be read out using the data carrier reading device and to be read into a working memory of the navigation computer. In addition, the present invention relates to a navigation data carrier having navigation data stored in it as well as a method for generating it.

BACKGROUND INFORMATION

In propulsion devices, such as motor vehicles, aircraft, or ships, permanently installed navigation systems guide a driver of the means of propulsion from a current location to a desired destination quickly, simply, and reliably, without the driver of the means of propulsion having previously to plan a route in detail and to acquire the corresponding map materials. For this purpose, the appropriate navigation data, based, for example, on maps, area maps, or street maps, are stored in the navigation system, for example on CD-ROMs. The navigation device makes use of, for example, GPS (Global Positioning System) to determine an instantaneous location and to calculate the corresponding navigation instructions, which lead to a predetermined destination. In this context, the navigation data may contain data on streets and routes for motor vehicles.

However, before the navigation system can take on its task and calculate a route from the current location to the destination, it is necessary that a user enter the desired destination and, in navigation devices without GPS, also the current location. This occurs, for example, via a voice-operated system. In voice-operated navigation of this type using phonetic characters, a so-called list matching is necessary. This denotes a comparison of a letter-hypothesis of a voice recognition unit with possible destinations, such as cities, street names, or special destinations in the list of possible destinations. Of use for the list matching are, on the one hand, data from the voice-operated system, the aforementioned hypotheses, and, on the other hand, a list of possible destinations, which is stored, for example, on a navigation CD-ROM as input data.

In conventional voice recognition systems, the list of possible destinations is loaded in a working memory of a computer and is kept there. However, this has the disadvantage of requiring a great deal of memory space and is therefore very uneconomical, since navigation systems that are furnished with voice- recognition systems of this type are very cost-intensive and are therefore not competitive on the market. It is therefore necessary to transfer the data for the list comparison from the navigation CD-ROM to the working memory of the computer of the navigation system only at those times in which the list of possible destinations is actually required. However, since the data on the navigation CD-ROM are available sorted according to corresponding index references, reading out the data from the navigation CD-ROM is very time-consuming because the read head of a CD-ROM disk drive must again and again travel back and forth between the index table and actual data and, accordingly, must be repositioned each time. The result is long transfer times for the list of possible destinations, from the navigation CD-ROM to the working memory of the computer of the navigation system.

SUMMARY

An object of the present invention is to provide an improved navigation system, an improved method for operating it, an improved navigation data carrier of the above-mentioned type as well as an improved method of the above-mentioned type for writing onto a navigation data carrier, such that the above mentioned disadvantages are removed and a cost-effective use of a voice-controlled system is achieved for a navigation system.

In a navigation system according to the present invention, the navigation data carrier is configured such that the navigation data are stored on it in sequential form so as to be able to be read out in one read operation.

In addition, in a method for operating this navigation system, it is provided according to the present invention that the navigation data are read out from the navigation data carrier sequentially, in one single read operation, and are read into the working memory of the navigation computer.

This has the advantage that the navigation data can be read out completely, in sequence, and without requiring a repositioning of the read head of the data carrier reading device, resulting in a particularly short transfer time of the navigation data from the navigation data carrier into the working memory of the navigation computer. In this manner, it is possible to integrate in a navigation system a voice-controlled system in which the navigation data for the voice recognition are only stored temporarily in the working memory and this working memory is otherwise available for other tasks or processes of the navigation system. Thus, to a significant degree, the use of the working memory is economized, resulting in a more cost-effective navigation system.

Time is also saved in the transfer of navigation data from the navigation data carrier into the working memory of the navigation computer as a result of the fact that the navigation data on the navigation data carrier are stored in compressed form.

In an example embodiment, the data carrier reading device is a CD-ROM disk drive and the data carrier is a navigation CD-ROM.

According to the present invention navigation data on the navigation data carrier (e.g./a CD-ROM) are stored sequentially, such that the navigation data can be read out sequentially in one single read operation.

In a method according to the present invention, navigation data are stored sequentially, one set of data immediately following the other, on the navigation data carrier.

This has the advantage that the data can be read out completely in one single read operation by a data carrier reading device of a navigation system in a directly sequential manner, without placing or repositioning a read head.

Because the navigation data is compressed before being written onto the navigation data carrier, it is advantageously possible that the navigation data, upon being read out by a data carrier reading device of the navigation system, can be written directly into the working memory of the navigation computer without further conversion. This additionally reduces the time necessary for the transfer of the navigation data from the navigation data carrier to the working memory of the navigation computer.

In this context, the present invention is based on the knowledge that storing data on a CD-ROM using an index list helps achieve the goal of being able to set the read head of a CD-ROM disk drive at any point on the data on a CD-ROM and to be able to read out a desired excerpt of the data on the CD-ROM without having to read all of the data previously stored on the track of the CD-ROM. However, this is not required for the application of the navigation CD-ROM in a navigation system using a voice-controlled system, since for the voice recognition here, the entire content of the navigation CD-ROM, in any case, must temporarily be read into the working memory of the computer of the navigation system.

BRIEF DESCRIPTION OF THE DRAWING

The FIGURE shows a schematic block diagram of a navigation system according to the present invention.

DETAILED DESCRIPTION

The FIGURE depicts an example embodiment of a navigation system 100 according to the present invention, having a navigation computer 10, an audio component 12, such as a radio or a cassette player, a CD-ROM disk drive 14, a navigation data carrier 200 in the form of a navigation CD-ROM, and a voice-controlled system 16. Navigation computer 10 receives from the voice-controlled system appropriate data of voice entries, which are compared with the navigation data loaded from navigation CD-ROM 200 into an undepicted working memory. In the event of agreement, a corresponding destination and, if appropriate, a current location are stored as being recognized, and navigation computer 10 removes from its working memory the previously loaded navigation data of navigation CD-ROM 200 and instead uses the working memory for the subsequent route calculation from the current location to the recognized destination. On a display 18 of navigation system 100, navigation computer 10 provides appropriate navigation directions to a user of navigation system 100.

The navigation data, such as city and street names, are stored in compressed form sequentially, the sets of data directly following each other, on track 20 on navigation CD-ROM 200. In this manner, the data can be read out from CD-ROM disk drive 14, without the assistance of an index table, the sets of data directly following one another, in one single read operation, without having to place down and reposition read head 22 even once. Since the navigation data are already compressed, they do not have to be further converted into a format necessary for a list matching but rather can be written directly into the working memory of the navigation computer.

As a result, a significantly shorter time period is required for the transfer of the navigation data from navigation CD-ROM 200 to the working memory of the navigation computer, as a result of which the cost-effective use of a voice-operated system becomes possible in a navigation system. Thus, instead of having to provide a working memory for all of the navigation data, memory which otherwise would remain unused, the navigation data can be rapidly read into the working memory of the navigation computer temporarily and, after the voice recognition, can be deleted. A permanent storage of the navigation-data in the working memory of the navigation computer is therefore no longer necessary, as a result of which significant memory space is saved in the implementation of a voice-controlled system.

The data for the list matching are compressed, for example, using a data compression algorithm. These compressed data are stored on the navigation CD-ROM in sequential order, so that the read operation can take place without a repositioning of the read head of the CD-ROM disk drive. Therefore, the possibility arises of transferring this data in a time that is minimal for the data transfer.

CD-ROM disk drive 14 is depicted in the single FIGURE, by way of example, as a separate, additional component. Alternatively, CD-ROM disk drive 14 can also be integrated into audio component 12.

What is claimed is:

1. A navigation system for use in a vehicle, comprising:
    a navigation data carrier storing navigation data related to destinations, the navigator data carrier configured to store the navigation data in sequential form so that the navigation data is readable in a single read operation;
    a navigation data carrier reading device; and
    a navigation computer, the navigation data reading device reading the navigation data stored on the navigation data carrier into a working memory of the navigation computer.

2. The navigation system according to claim 1, wherein the navigation data is stored on the navigation data carrier in compressed form.

3. The navigation system according to claim 1, wherein the navigation data carrier reading device is a CD-ROM disk drive, and the navigation data carrier is a navigation CD-ROM.

4. The navigation system according to claim 1, wherein the navigation computer is operable for at least one of:
    receiving voice entry data from a voice-controlled system and comparing the voice entry data with the navigation data in the working memory; and
    removing previously loaded navigation data from the working memory and using the working memory to determine a route.

5. The navigation system according to claim 1, wherein:
    the navigation data is storable on the navigation data carrier in compressed form;
    the navigation data carrier reading device is a CD-ROM disk drive; and
    the navigation data carrier is a navigation CD-ROM.

6. The navigation system according to claim 5, wherein the navigation data carrier reading device and the navigation data carrier are located in the vehicle.

7. A method for operating a navigation system for use in a vehicle, comprising:
    sequentially reading out navigation data in a single read operation from a navigation data carrier using a data carrier reading device; and
    transferring the navigation data read out to a working memory of the navigation computer.

8. The method according to claim 7, further comprising:
    storing the navigation data on the navigation data carrier in compressed form.

9. The method according to claim 7, wherein the step of sequentially reading out includes the step of sequentially reading out navigation data in a single read operation from a navigation CD-ROM using a CD-ROM disk drive.

10. The method according to claim 7, further comprising the step of storing the navigation data on the navigation data carrier in compressed form;
    wherein the step of sequentially reading out includes the step of sequentially reading out navigation data in a single read operation from a navigation CD-ROM using a CD-ROM disk drive.

11. The method according to claim 10, wherein the navigation CD-ROM and the CD-ROM disk drive are located in the vehicle.

12. A navigation data carrier, the navigation data carrier being for use with a navigation data carrier reading device in a vehicle, comprising:

a device storing navigation data, the navigation data being stored on the navigation data carrier sequentially so that the navigation data is configured to be read out sequentially in a single read operation.

13. The navigation data carrier according to claim 12, wherein the device is a navigation CD-ROM.

14. The navigation data carrier according to claim 12, wherein:

the device is a navigation CD-ROM; and the navigation data is storable on the navigation data carrier in compressed form.

15. The navigation data carrier according to claim 14, wherein the navigation data carrier reading device and the navigation data carrier are located in the vehicle.

16. The navigation data carrier according to claim 12, wherein the navigation data is stored on the navigation data carrier in compressed form.

17. A method for writing navigation data onto a navigation data carrier, the navigation data carrier being for use with a navigation data carrier reading device in a vehicle, comprising:

sequentially storing the navigation data on the navigation data carrier, one set of the navigation data immediately following another set of the navigation data.

18. The method according to claim 17, wherein the step of sequentially storing includes the step of sequentially storing the navigation data on a navigation CD-ROM.

19. The method according to claim 17, further comprising:

compressing the navigation data prior to the sequentially storing step.

20. The method according to claim 17, further comprising the step of compressing the navigation data prior to the sequentially storing step;

wherein the step of sequentially storing includes the step of sequentially storing the navigation data on a navigation CD-ROM.

21. The method according to claim 20, wherein the navigation data carrier reading device and the navigation data carrier are located in the vehicle.

\* \* \* \* \*